(12) United States Patent
Zhao et al.

(10) Patent No.: US 8,786,817 B2
(45) Date of Patent: Jul. 22, 2014

(54) LIQUID CRYSTAL PANEL AND MANUFACTURING METHOD THEREOF

(75) Inventors: Guodong Zhao, Shenzhen (CN); Tao Song, Shenzhen (CN); Tao Ma, Shenzhen (CN); Ming Liu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 182 days.

(21) Appl. No.: 13/519,908

(22) PCT Filed: Apr. 27, 2012

(86) PCT No.: PCT/CN2012/074821
§ 371 (c)(1),
(2), (4) Date: Jun. 29, 2012

(87) PCT Pub. No.: WO2013/152533
PCT Pub. Date: Oct. 17, 2013

(65) Prior Publication Data
US 2013/0271685 A1    Oct. 17, 2013

(30) Foreign Application Priority Data

Apr. 11, 2012  (CN) .......................... 2012 1 0104826

(51) Int. Cl.
*G02F 1/1339* (2006.01)
(52) U.S. Cl.
USPC .......................................................... 349/153
(58) Field of Classification Search
CPC ................................................... G02F 1/1339
USPC .......................................................... 349/153
See application file for complete search history.

(56) References Cited

U.S. PATENT DOCUMENTS 6,705,584 B2 *  3/2004  Hiroshima et al. ........... 249/155
7,113,248 B2 *  9/2006  Chung et al. .................. 349/153

FOREIGN PATENT DOCUMENTS

CN    102262319 A    11/2011
CN    102289111 A    12/2011

OTHER PUBLICATIONS

International Search Report of PCT Application No. PCT/CN2012/074821, Apr. 27, 2012.

* cited by examiner

*Primary Examiner* — James Dudek

(57) ABSTRACT

A liquid crystal panel includes a liquid crystal layer and a substrate. The substrate includes a sealant bonding area, a cutting edge surrounding the sealant bonding area, and an abutting portion disposed between the sealant bonding area and the cutting edge. A height of the abutting portion is less than a thickness of the liquid crystal layer. The present disclosure further provides a manufacturing method of the liquid crystal panel. With the abutting portion disposed outside the sealant, the uncured sealant is limited from flowing to the cutting edge during the process of bonding the TFT substrate and the CF substrate. Thus, the manufacturing process of the liquid crystal panel may not be influenced by the uncured sealant, and the distance L between the sealant and the cutting edge can be shortened to improve the coating precision of the sealant and the utilization rate of the substrate.

7 Claims, 3 Drawing Sheets

LIQUID CRYSTAL PANEL AND MANUFACTURING METHOD THEREOF

BACKGROUND

1. Technical Field

The present disclosure relates to liquid crystal panel technologies, and particularly, to a liquid crystal panel and a manufacturing method thereof.

2. Description of Related Art

Nowadays, in the manufacturing process of high generation liquid crystal panels, liquid crystals are dispensed on a substrate using one drip fill technology. Sealant is coated on another substrate so that the two substrates can be vacuum bonded. After the sealant is cured by curing processes including but not limited to ultraviolet curing process and high temperature curing process, the substrates are cut. In the manufacturing process of the liquid crystal panel, the sealant is coated on the substrate in advance. Referring to FIG. 1, a conventional liquid crystal panel 100 is shown. Black matrix 102 is disposed around a display area 101, and sealant 103 is disposed on the black matrix 102 and surrounds the display area 101. A rectangular cutting line 104 surrounds the black matrix 102.

In the conventional manufacturing process of the liquid crystal panel, precision of the machine used for coating the sealant is only about ±200 um, which is not high enough to control the width of the sealant at jointing points. At this time, in order to prevent the uncured sealant from flowing to the cutting line, a long distance L is predetermined between the edge of the sealant 103 and the cutting line 104. However, this may limit the percentage of the display area 101 in the liquid crystal panel 100, which is not beneficial to the production of the liquid crystal panel and may result in a waste of the substrate.

Therefore, there is room for improvement in the art.

SUMMARY

One object of the present disclosure is to provide a liquid crystal panel. The liquid crystal panel includes a liquid crystal layer and a substrate. The substrate includes a sealant bonding area, a cutting edge surrounding the sealant bonding area, and an abutting portion disposed between the sealant bonding area and the cutting edge. A height of the abutting portion is less than a thickness of the liquid crystal layer.

Preferably, the substrate includes a thin film transistor substrate and a color filter substrate, the abutting portion includes a first abutting portion and a second abutting portion, the first abutting portion is disposed on the thin film transistor substrate, the second abutting portion is disposed on the color filter substrate, and the total width of the first abutting portion and the second abutting portion range from 30 um to 50 um.

Preferably, the heights of the first abutting portion and the second abutting portion are respectively greater than one-half of the thickness of the liquid crystal layer, and the first abutting portion is misaligned with the second abutting portion; or, the heights of the first abutting portion and the second abutting portion are respectively less than one-half of the thickness of the liquid crystal layer, and the first abutting portion and the second abutting portion are aligned with each other.

Preferably, the substrate is a thin film transistor substrate, and the thin film transistor substrate includes a thin film transistor array layer and a peripheral circuit, the sealant bonding area is located in the area of the peripheral circuit, and the abutting portion is disposed on the peripheral circuit.

Preferably, the substrate is a color filter substrate, the color filter substrate includes a color filter layer and light shielding layer, the sealant bonding area is located in the light shielding area, and the abutting portion is disposed on the light shielding layer.

The present disclosure further provides another liquid crystal panel. The liquid crystal panel includes a substrate. The substrate includes a sealant bonding area, a cutting edge surrounding the sealant bonding area, and an abutting portion disposed between the sealant bonding area and the cutting edge.

Preferably, the substrate includes a thin film transistor substrate and a color filter substrate, the abutting portion includes a first abutting portion and a second abutting portion, the first abutting portion is disposed on the thin film transistor substrate, and the second abutting portion is disposed on the color filter substrate.

Preferably, the liquid crystal panel further includes a liquid crystal layer, heights of the first abutting portion and the second abutting portion are respectively greater than one-half of a thickness of the liquid crystal layer, and the first abutting portion is misaligned with the second abutting portion.

Preferably, the liquid crystal panel further includes a liquid crystal layer, the heights of the first abutting portion and the second abutting portion are respectively less than one-half of a thickness of the liquid crystal layer, and the first abutting portion is aligned with the second abutting portion.

Preferably, the substrate is a thin film transistor substrate, and the thin film transistor substrate includes a thin film transistor array layer and a peripheral circuit, the sealant bonding area is located in the area of the peripheral circuit, and the abutting portion is disposed on the peripheral circuit.

Preferably, the liquid crystal panel further includes a liquid crystal layer, a height of the abutting portion is less than a thickness of the liquid crystal layer, and a width of the abutting portion ranges from 30 um to 50 um.

Preferably, the substrate is color filter substrate, the color filter substrate includes a color filter layer and a light shielding layer, the sealant bonding area is located in the light shielding area, and the abutting portion is disposed on the light shielding layer.

Preferably, the liquid crystal panel further includes a liquid crystal layer, the height of the abutting portion is less than the thickness of the liquid crystal layer, and the width of the abutting portion ranges from 30 um to 50 um.

The present disclosure further provides a manufacturing method of a liquid crystal panel. The manufacturing method includes the following steps: providing a substrate includes a sealant bonding area and a cutting edge surrounding the sealant bonding area; and forming an abutting portion between the sealant bonding area and the cutting edge.

Preferably, the substrate includes a thin film transistor substrate, the thin film transistor substrate includes a first substrate having the cutting edge, and the step of forming an abutting portion between the sealant bonding area and the cutting edge includes: forming a thin film transistor array layer and a peripheral circuit on the first substrate, and providing a first sealant bonding area in the area of the peripheral circuit; and forming the abutting portion between the first sealant bonding area and the cutting edge of the first substrate.

Preferably, the substrate further includes a color filter substrate, the color filter substrate includes a second substrate having the cutting edge, and the step of forming an abutting portion between the sealant bonding area and the cutting edge includes: forming a light shielding layer on the second substrate and providing a second sealant bonding area in the light shielding layer; and forming a color filter layer and the abutting portion on the second substrate, and the abutting portion is located between the second sealant area and the cutting edge of the second substrate.

Preferably, the substrate includes a thin film transistor substrate, the thin film transistor substrate includes a first substrate having the cutting edge, and the step of forming the abutting portion between the sealant bonding area and the cutting edge includes: forming a thin film transistor array layer, a peripheral circuit, and the abutting portion on the first substrate, providing a first sealant bonding area in the area of the peripheral circuit; and the abutting portion is between the first sealant bonding area and the cutting edge.

Preferably, the substrate further includes a color filter substrate, the color filter substrate includes a second substrate having the cutting edge, and the step of forming an abutting portion between the sealant bonding area and the cutting edge includes: forming a light shielding layer on the second substrate and providing a second sealant bonding area in the light shielding layer; and forming a color filter layer and the abutting portion on the second substrate, and the abutting portion is located between the second sealant area and the cutting edge of the second substrate.

Preferably, the substrate further includes a color filter substrate, the color filter substrate includes a second substrate having the cutting edge, and the step of forming an abutting portion between the sealant bonding area and the cutting edge includes: arranging a black thin film on the second substrate, exposing and developing the black thin film to form the light shielding layer and the abutting portion and providing a second sealant bonding area in the light shielding area; and the abutting portion is between the second sealant bonding area and the cutting edge of the second substrate.

Preferably, the substrate further includes a color filter substrate, the color filter substrate includes a second substrate having the cutting edge, and the step of forming an abutting portion between the sealant bonding area and the cutting edge includes: forming a light shielding layer on the second substrate and providing a second sealant bonding area in the light shielding layer; and forming the color filter layer and the abutting portion on the second substrate, and the abutting portion is located between the second sealant bonding area and the cutting edge of the second substrate.

With the abutting portion disposed outside the sealant, the uncured sealant can be limited from flowing to the cutting edge of the liquid crystal panel during the process of bonding the TFT substrate and the CF substrate. Thus, the manufacturing process of the liquid crystal panel may not be influenced by the uncured sealant, and the distance L between the sealant and the cutting edge can be shortened to improve the coating precision of the sealant and the utilization rate of the substrate.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
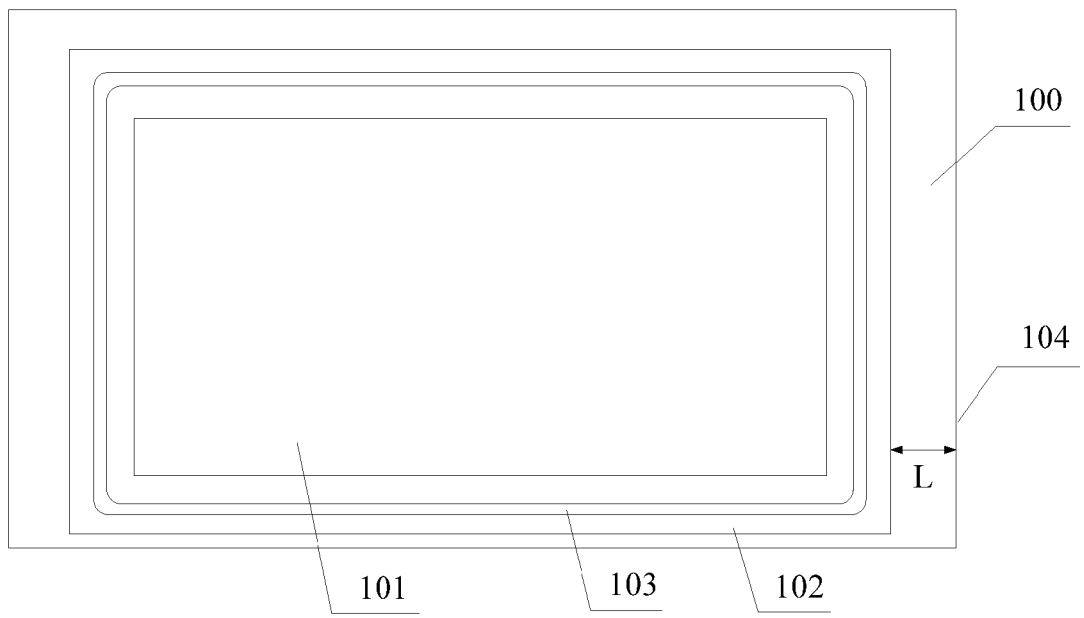
FIG. 1 is a schematic view of a conventional liquid crystal panel.
Figure 2:
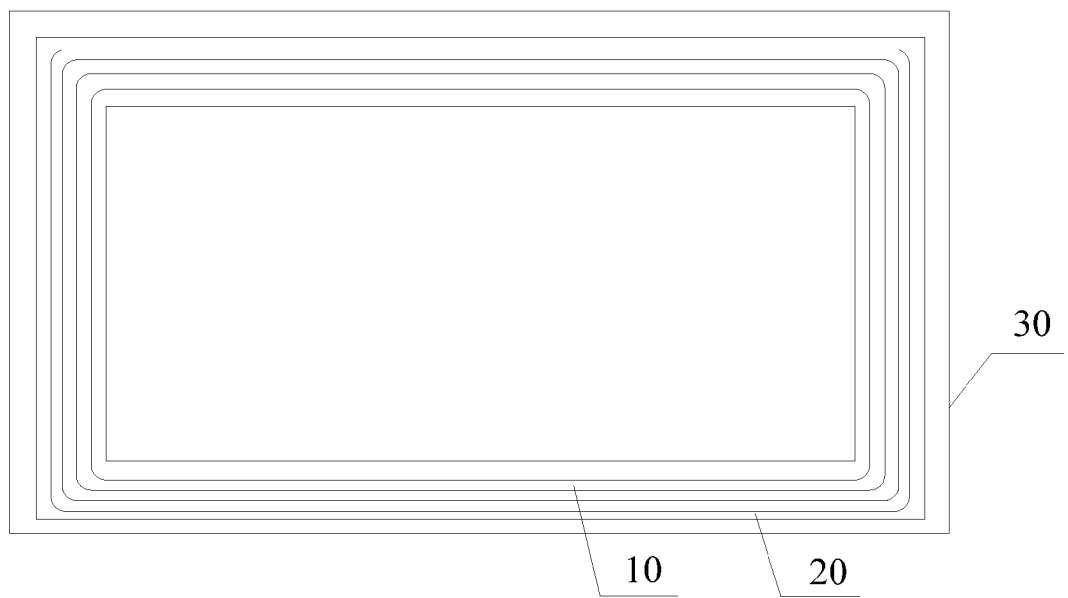
FIG. 2 is a schematic view of a liquid crystal panel of the present disclosure.

Referring to FIG. 2, which is a schematic view of a liquid crystal panel of the present disclosure. The liquid crystal panel includes a substrate. The substrate includes a sealant bonding area 10 and a cutting edge 30 surrounding the sealant bonding area 10. Sealant (not shown) is disposed in the sealant bonding area 10 for bonding two substrates in the manufacturing process of the liquid crystal panel. The liquid crystal panel further includes an abutting portion 20 disposed between the sealant bonding area 10 and the cutting edge 30.

With the abutting portion 20 disposed outside the sealant bonding area 10, uncured sealant is prevented from flowing to the cutting edge 30. Thus, the uncured sealant may not influence the manufacturing process of the liquid crystal panel and a distance between the sealant bonding area 10 and the cutting edge 30 can be reduced, which not only increases the coating precision of the sealant, but also improves the utilization rate of the substrate.

Figure 3:
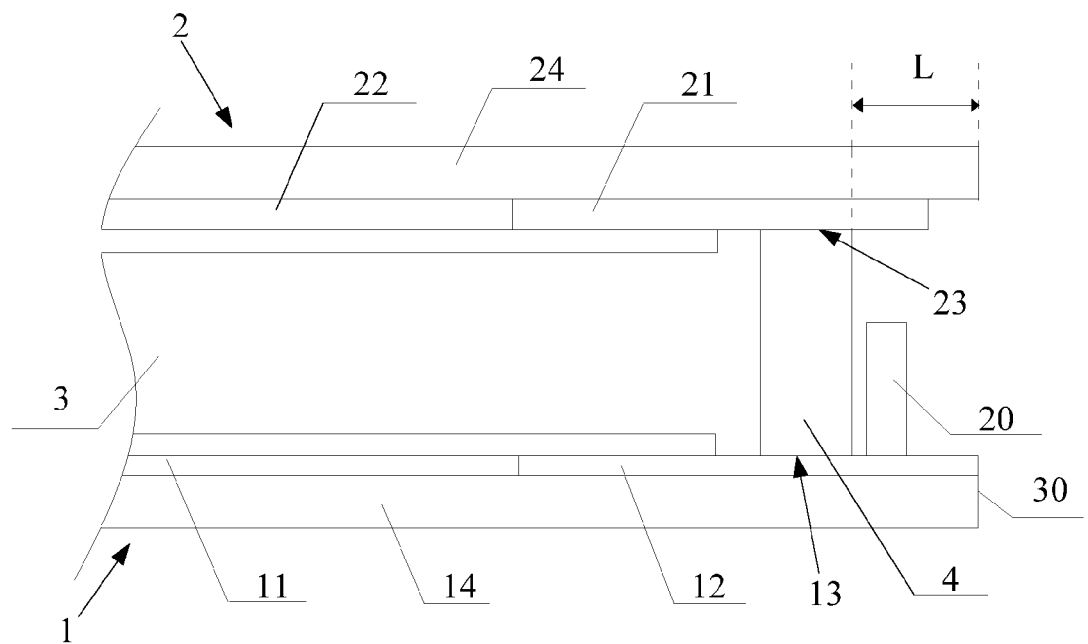
FIG. 3 is a cross-sectional view of the liquid crystal panel in accordance with a first embodiment of the present disclosure.

Referring to FIG. 3, which is a cross-sectional view of the liquid crystal panel in accordance with a first embodiment of the present disclosure. In the embodiment, the liquid crystal panel includes a thin film transistor (TFT) substrate 1, a color filter (CF) substrate 2, a liquid crystal layer 3, and a sealant 4. The liquid crystal layer 3 and the sealant 4 are disposed between the TFT substrate 1 and the CF substrate 3. The CF substrate 2 includes a second substrate 24, a CF layer 21, a light shielding layer 22, and a second sealant bonding area 23 located in the light shielding area 22. The CF layer 21, the light shielding layer 22, and the second sealant bonding area 23 are all disposed on the second substrate 24. The TFT substrate 1 includes a first substrate 14. A TFT array layer 11, a peripheral circuit 12, and a first sealant bonding area 13 defined in the peripheral circuit 12 are all disposed on the first substrate 14. The sealant 4 is arranged on the first sealant bonding area 13 and the second sealant bonding area 23 for bonding the TFT substrate 1 and the CF substrate 2 when the two substrates 1 and 2 are attached to each other. The abutting portion 20 is arranged between the first sealant area 13 and the cutting edge 30, and is located on the peripheral circuit 12 but outside the sealant 4.

In the embodiment, a black film can be provided on the first substrate 14, and further be exposed and developed to form the abutting portion 20. In other embodiments, the abutting portion 20 can be simultaneously formed with the TFT array layer 11 and the peripheral circuit 12. At this time, the abutting portion 20 may be made of metal and insulating material, and the configuration thereof may be the same as that of the TFT array layer 11.

The abutting portion 20 is used for limiting the flowing of the uncured sealant 4 and a height thereof is less than a thickness of the liquid crystal layer 3. A width of the abutting portion 20 may range from 30 um to 50 um. With the abutting portion 20, the uncured sealant 4 is limited by the abutting portion 20 during the process of bonding the TFT substrate 1 and the CF substrate 2. Therefore, the distance L between the sealant 4 and the cutting edge 30 can be shortened to improve the coating precision of the sealant 4 and the utilization rate of the substrate.

Figure 4:
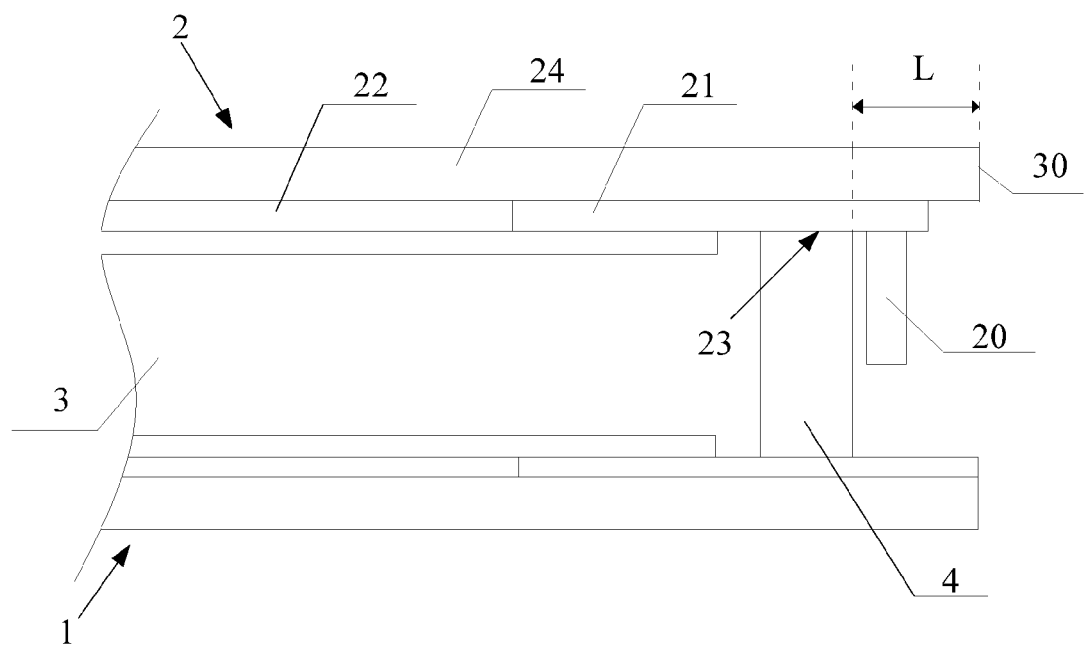
FIG. 4 is a cross-sectional view of the liquid crystal panel in accordance with a second embodiment of the present disclosure.

Referring to FIG. 4, a liquid crystal panel, in accordance with a second embodiment of the present disclosure, is shown. In the embodiment, the liquid crystal panel includes a TFT substrate 1, a CF substrate 2, a liquid crystal panel 3, and a sealant 4. The liquid crystal player 3 and the sealant 4 are disposed between the TFT substrate 1 and the CF substrate 2. The difference between the liquid crystal panel of the second embodiment and that of the first embodiment lies in that, the abutting portion 20 of the second embodiment is disposed on the light shielding layer 21, and the abutting portion 20 is located between the second sealant area 23 and the cutting edge 30. A black thin film can be arranged on the second substrate 24, and further can be exposed and developed to form the light shielding layer 21 and the abutting portion 20. At this time, the light shielding layer 21 and the abutting portion are made of the same material. It is noted that in other embodiments, the abutting portion 20 may be simultaneously formed with the CF layer 22 or spacers (not shown) on the second substrate 24. At this time, the abutting portion 20 may be made of color resistance material of the CF layer 22 or the spacers, or may be made of the mixture of the color resistance material and the spacers.

In this embodiment, the abutting portion 20 limits the flowing of the uncured sealant 4. The height of the abutting portion 20 is smaller than the thickness of the liquid crystal layer 3, and the width thereof ranges from 30 um to 50 um. With the abutting portion 20, the uncured sealant is limited by the abutting portion 20 during the process of bonding the TFT substrate 1 and the CF substrate 2. Therefore, the distance L between the sealant 4 and the cutting edges 30 can be shortened to improve the coating precision of the sealant 4 and the utilization rate of the substrate.

Figure 5:
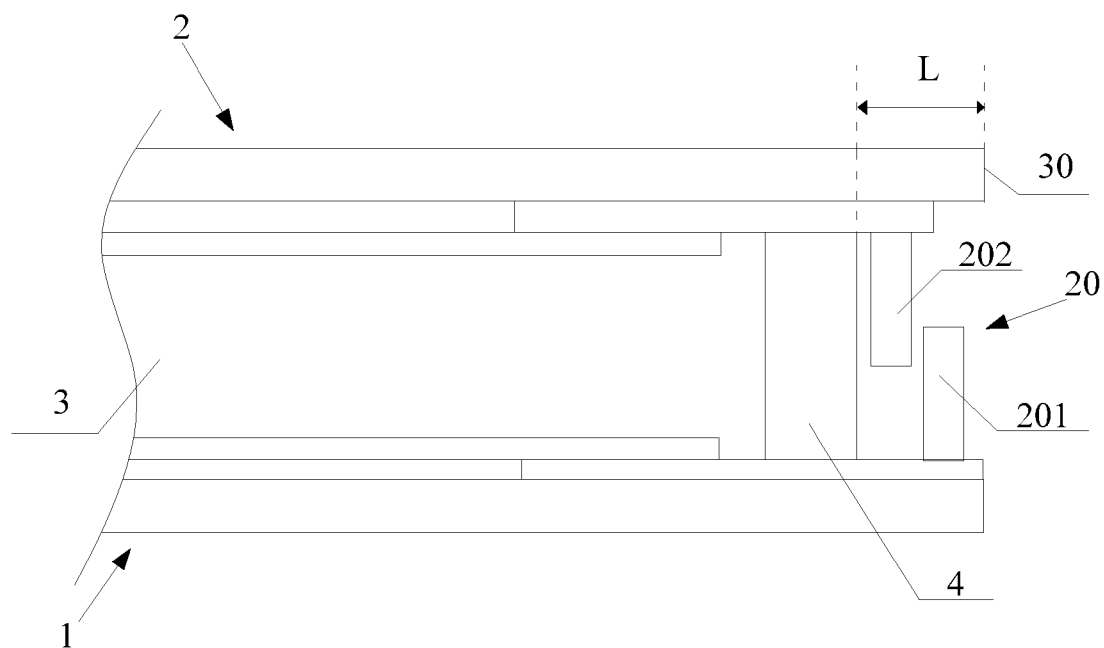
FIG. 5 is a cross-sectional view of the liquid crystal panel in accordance with a third embodiment of the present disclosure.

Referring to FIG. 5, a liquid crystal panel, in accordance with a third embodiment, is shown. In the embodiment, the liquid crystal panel includes a TFT substrate 1, a CF substrate 2, a liquid crystal layer 3, and a sealant 4. The liquid crystal layer 3 and the sealant 4 are disposed between the TFT substrate 1 and the CF substrate 2. The difference between the liquid crystal panel of the third embodiment and those of the first and second embodiment lies in that, the abutting portion 20 in this embodiment includes a first abutting portion 201 and a second abutting portion 202. The first abutting portion 201 is disposed on the TFT substrate 1 and the second abutting portion 202 is disposed on the CF substrate 2. The heights of the first and second abutting portions 201, 202 respectively range from half of the thickness of the liquid crystal layer 3 to the thickness of the liquid crystal layer 3. The total width of the first and second abutting portions 201, 202 range from 30 um to 50 um. When TFT substrate 1 and the CF substrate 2 are bonded, the first abutting portion 201 and the second abutting portion 202 are misaligned with each other. In this way, the abutting portion 20 can further limit the uncured sealant 4 from flowing to the cutting edge 30. In other embodiments, the heights of the first abutting portion 201 and the second abutting portion 202 may respectively be less than one-half of the thickness of the liquid crystal layer 3. In this situation, the first abutting portion 201 may be aligned with the second abutting portion 202 when the TFT substrate 1 and the CF substrate 2 are bonded together. The configurations of the first and second abutting portions 201, 202 may be the same as that in the first or second embodiments. With the first and second abutting portions 201, 202, the distance L between the sealant 4 and the cutting edge 30 is shortened for further limiting the uncured sealant from flowing to the cutting edge 30.

Figure 6:
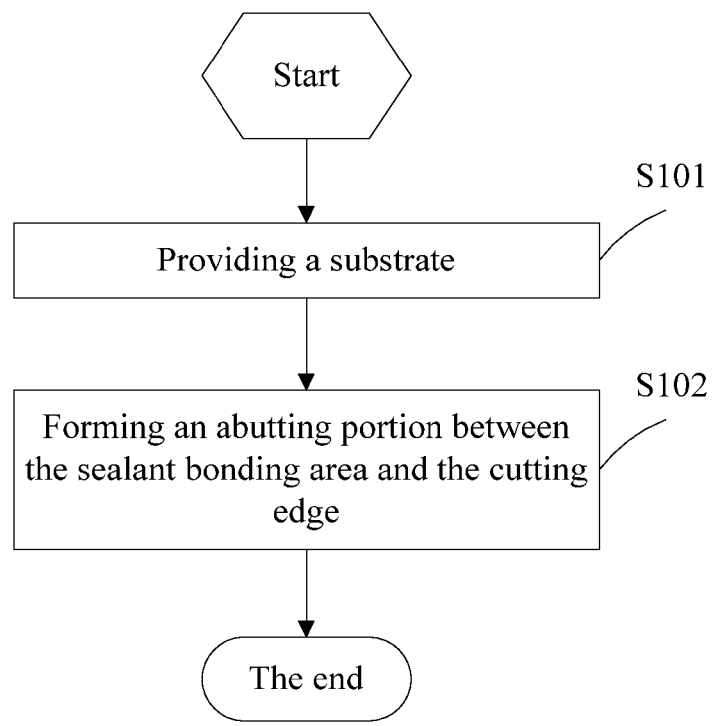
FIG. 6 is a flow chart of a manufacturing method of the liquid crystal panel.

Referring to FIG. 6, which is a flow chart showing the manufacturing method of the liquid crystal panel. The manufacturing method includes the following steps:

Step S101, providing a substrate, and the substrate includes a sealant bonding area 10 and a cutting edge 30 surrounding the sealant bonding area 10.

Step S102, forming an abutting portion 20 between the sealant bonding area 10 and the cutting edge 30.

With the abutting portion 20 disposed between the sealant bonding area 10 and the cutting edge 30, the uncured sealant can be prevented from flowing to the cutting edge 30 during the process of bonding the substrates. Thus, the manufacturing process of the liquid crystal panel may not be influenced by the uncured sealant and the distance between the sealant bonding area 10 and the cutting edge 30 can be shortened. Thus, the coating precision of the sealant and utilization rate of the substrate have been improved.

In a first embodiment of the manufacturing method of the liquid crystal panel, the substrate is a TFT substrate 1. The TFT substrate 1 includes the cutting edge 30 and a first substrate 14. The manufacturing method in this embodiment includes the following steps:

Step A1, forming a TFT arrays layer 11 and a peripheral circuit 12 on the first substrate 14, and providing a first sealant bonding area 13 on the peripheral circuit 12. In this embodiment, the TFT array layer 11 and the peripheral circuit 12 are formed on the first substrate 14 by the following processes including but not limited to filming process, photoresist coating process, exposure process, developing process, etching process, and photoresist stripping process.

Step A2, forming the abutting portion 20 between the first sealant area 13 and the cutting edge 20. In the embodiment, a black film can be arranged on the TFT substrate 1, and further be exposed and developed to form the abutting portion on the FTF substrate 1.

The present disclosure further provides a second embodiment of the manufacturing method of the liquid crystal panel, the substrate is a TFT substrate 1. The difference between the manufacturing method of the second embodiment and that of the first embodiment lies in that, the TFT array layer 11 and the peripheral circuit 12 are formed by the following processes including but not limited to filming process, photoresist coating process, exposure process, developing process, etching process, and photoresist stripping process. The abutting portion 20 is simultaneously formed with the TFT array layer 11 and the peripheral circuit 12. The first sealant bonding area 13 is disposed on the peripheral circuit 12, and the abutting portion 20 is disposed between the first sealant area 13 and the cutting edge 30.

The abutting portion 20 is used for limiting the flowing of the uncured sealant 4 and a height thereof is less than the thickness of the liquid crystal layer 3. The width of the abutting portion 20 may range from 30 um to 50 um. With the abutting portion 20, the uncured sealant is limited by the abutting portion 20 during the process of bonding the TFT substrate 1 and the CF substrate 2. Therefore, the distance L between the sealant 4 and the cutting edges 30 can be shortened to improve the coating precision of the sealant 4 and the utilization rate of the substrate.

The present disclosure further provides a third embodiment of the manufacturing method of the liquid crystal panel. In the embodiment, the substrate is a CF substrate 2, and includes a second substrate 24 which has a cutting edge 30. Referring to FIG. 4, the manufacturing method in this embodiment includes the following steps:

Step B1, forming a light shielding layer 21 and an abutting portion 20 on the second substrate 24. In the step, a black thin film can be arranged on the second substrate 24, and further be exposed and developed to form the light shielding layer 21 and the abutting portion 20. A second sealant bonding area 23 is provided in the light shielding layer 21. The abutting portion 20 is located on the light shielding layer 21 and formed between the second sealant bonding area 23 and the cutting edge 30.

Step B2, forming a color filter layer 22 on the substrate 24. It is noted that in other embodiments, the abutting portion 20 may be simultaneously formed with the CF layer 22 or spacers (not shown) on the second substrate 24. At this time, the abutting portion 20 may be made of color resistance material of the CF layer 22 or the spacers, or may be made of the mixture of the color resistance material and the spacers.

In this embodiment, the abutting portion 20 limits the flowing of the uncured sealant 4. The height of the abutting portion 20 is smaller than the thickness of the liquid crystal layer 3, and the width thereof ranges from 30 um to 50 um. With the abutting portion 20, the uncured sealant is limited by the abutting portion 20 during the process of bonding the TFT substrate 1 and the CF substrate 2. Therefore, the distance L between the sealant 4 and the cutting edge 30 can be shortened to improve the coating precision of the sealant 4 and the utilization rate of the substrate.

The present disclosure further provides a forth embodiment of the manufacturing method of the liquid crystal panel. The substrate in the embodiment includes a TFT substrate 1 and a CF substrate 2. Referring to FIG. 5, the abutting portion 20 in this embodiment includes a first abutting portion 201 formed on the TFT substrate 1 and a second abutting portion 202 formed on the CF substrate 2, thereby improving the capacity of limiting the flowing of the uncured sealant. The heights of the first and second abutting portions 201, 202 respectively range from one-half of the thickness of the liquid crystal layer 3 to the thickness of the liquid crystal layer 3. The total width of the first and second abutting portions 201, 202 range from 30 um to 50 um. When the TFT substrate 1 and the CF substrate 2 are bonded, the first abutting portion 201 and the second abutting portion 202 are misaligned with each other. In other embodiments, the heights of the first abutting portion 201 and the second abutting portion 202 may respectively be less than one-half of the thickness of the liquid crystal layer 3. In this situation, the first abutting portion 201 may be aligned with the second abutting portion 202 when the TFT substrate 1 and the CF substrate 2 are bonded. The manufacturing process of the first and second abutting portions 201, 202 may be the same as that of the first and second embodiments. With the first and second abutting portions 201, 202, the distance L between the sealant 4 and the cutting edge 30 is shortened for further limiting the uncured sealant from flowing to the cutting edge 30.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A liquid crystal panel, comprising:
   a liquid crystal layer comprising a thin film transistor substrate and a color filter substrate; and
   a substrate, comprising:
   a sealant bonding area;
   a cutting edge surrounding the sealant bonding area; and
   an abutting portion disposed between the sealant bonding area and the cutting edge, wherein a height of the abutting portion being less than a thickness of the liquid crystal layer; the abutting portion comprises a first abutting portion and a second abutting portion, the first abutting portion is disposed on the thin film transistor substrate, the second abutting portion is disposed on the color filter substrate, and the total width of the first abutting portion and the second abutting portion range from 30 um to 50 um.

2. The liquid crystal panel as claimed in claim 1, wherein the heights of the first abutting portion and the second abutting portion are respectively greater than one-half of the thickness of the liquid crystal layer, and the first abutting portion is misaligned with the second abutting portion; or, the heights of the first abutting portion and the second abutting portion are respectively less than one-half of the thickness of the liquid crystal layer, and the first abutting portion and the second abutting portion are aligned with each other.

3. A liquid crystal panel comprising a substrate and a liquid crystal layer, the substrate comprising:
   a thin film transistor substrate and a color filter substrate;
   a sealant bonding area;
   a cutting edge surrounding the sealant bonding area; and
   an abutting portion disposed between the sealant bonding area and the cutting edge, comprising a first abutting portion and a second abutting portion, the first abutting portion is disposed on the thin film transistor substrate, and the second abutting portion is disposed on the color filter substrate, heights of the first abutting portion and the second abutting portion are respectively greater than one-half of a thickness of the liquid crystal layer, and the first abutting portion is misaligned with the second abutting portion.

4. A manufacturing method of a liquid crystal panel, the liquid crystal panel comprising a color filter substrate, the color filter substrate comprising a second substrate having a second substrate, the method comprising the following steps:
   providing a substrate comprising a sealant bonding area and a cutting edge surrounding the sealant bonding area;
   arranging a black thin film on the second substrate, exposing and developing the black thin film to form the light shielding layer and the abutting portion, and
   providing a second sealant bonding area in the light shielding area; and the abutting portion is between the second sealant bonding area and the cutting edge of the second substrate.

5. A liquid crystal panel comprising a substrate, the substrate comprising:
   a sealant bonding area;
   a cutting edge surrounding the sealant bonding area; and
   an abutting portion disposed between the sealant bonding area and the cutting edge;
   wherein the substrate comprises a thin film transistor substrate and a color filter substrate, the abutting portion comprises a first abutting portion and a second abutting portion, the first abutting portion is disposed on the thin film transistor substrate, and the second abutting portion is disposed on the color filter substrate; the liquid crystal panel further comprises a liquid crystal layer, the heights of the first abutting portion and the second abutting portion are respectively less than one-half of a thickness of the liquid crystal layer, and the first abutting portion is aligned with the second abutting portion.

6. A liquid crystal panel comprising a substrate, the substrate comprising:

a sealant bonding area;

a cutting edge surrounding the sealant bonding area; and an abutting portion disposed between the sealant bonding area and the cutting edge;

wherein the substrate is a thin film transistor substrate, and the thin film transistor substrate comprises a thin film transistor array layer and a peripheral circuit, the sealant bonding area is located in the area of the peripheral circuit, and the abutting portion is disposed on the peripheral circuit.

7. A liquid crystal panel comprising a substrate, the substrate comprising:

a sealant bonding area;

a cutting edge surrounding the sealant bonding area; and an abutting portion disposed between the sealant bonding area and the cutting edge;

wherein the substrate is color filter substrate, the color filter substrate comprises a color filter layer and a light shielding layer, the sealant bonding area is located in the light shielding area, and the abutting portion is disposed on the light shielding layer; the liquid crystal panel further comprises a liquid crystal layer, the height of the abutting portion is less than the thickness of the liquid crystal layer, and the width of the abutting portion ranges from 30 um to 50 um.

* * * * *